(12) United States Patent
Furukawa

(10) Patent No.: US 7,110,032 B2
(45) Date of Patent: Sep. 19, 2006

(54) SETTING CONTROL OF BRACKETING IMAGE SENSING OPERATION IN IMAGE SENSING APPARATUS

(75) Inventor: Nobuyuki Furukawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 10/283,746

(22) Filed: Oct. 30, 2002

(65) Prior Publication Data

US 2003/0081140 A1    May 1, 2003

(30) Foreign Application Priority Data

Oct. 30, 2001   (JP)   ............... 2001-332692

(51) Int. Cl.
*H04N 5/222*   (2006.01)
(52) U.S. Cl. ............................... 348/333.02
(58) Field of Classification Search .......... 348/333.01, 348/333.02, 333.04; 396/373, 374
See application file for complete search history.

(56) References Cited

U.S. PATENT DOCUMENTS 4,695,905 A * 9/1987 Utsugi .................. 386/118
5,424,772 A * 6/1995 Aoki et al. ............... 348/220.1
5,664,243 A * 9/1997 Okada et al. ............... 396/246
6,362,851 B1 * 3/2002 Lavelle et al. .......... 348/333.01

FOREIGN PATENT DOCUMENTS

| JP | 1-221994 | 9/1989 |
|---|---|---|
| JP | 8-29828 | 2/1996 |

* cited by examiner

*Primary Examiner*—Ngoc-Yen Vu
*Assistant Examiner*—Nicholas G Giles
(74) *Attorney, Agent, or Firm*—Morgan & Finnegan, LLP

(57) ABSTRACT

An image sensing apparatus capable of performing bracketing image sensing operations for a plurality of different types of parameters is provided. The image sensing apparatus comprises a selection unit adapted to select a parameter for performing a bracketing image sensing operation, and a controller adapted to prohibit a bracketing image sensing operation for other types of parameters in a case where the parameter for performing the bracketing image sensing operation is selected by the selection unit.

1 Claim, 10 Drawing Sheets

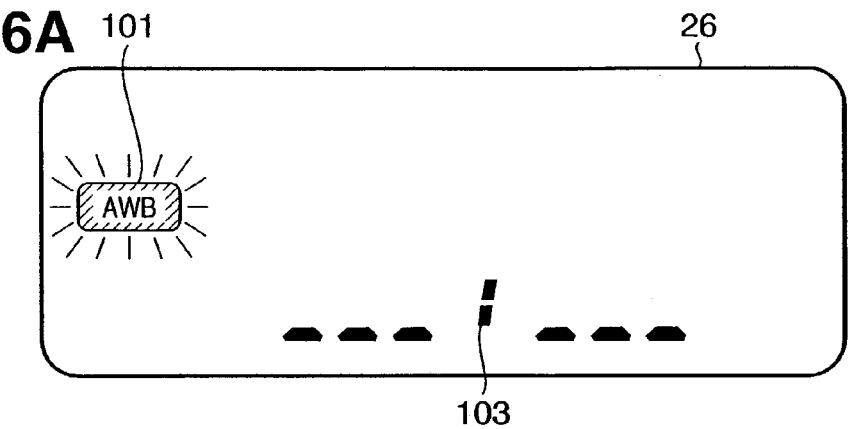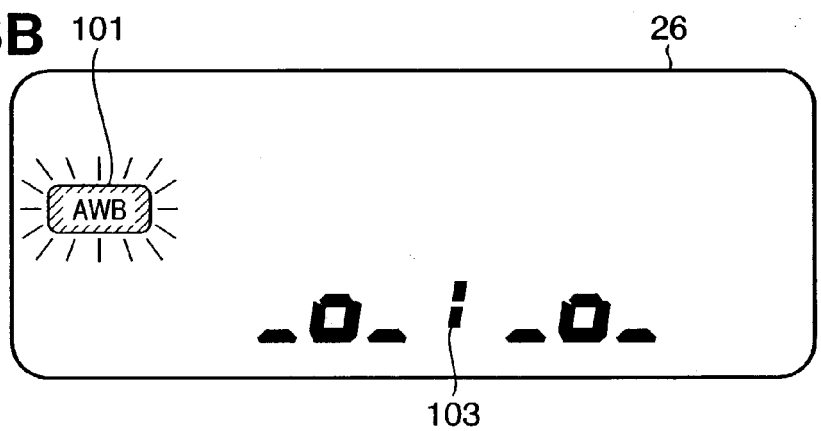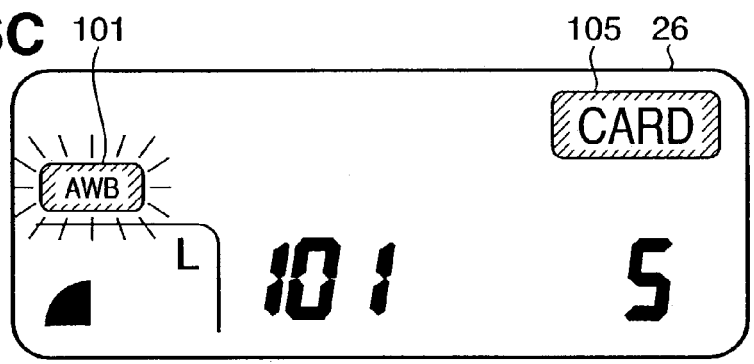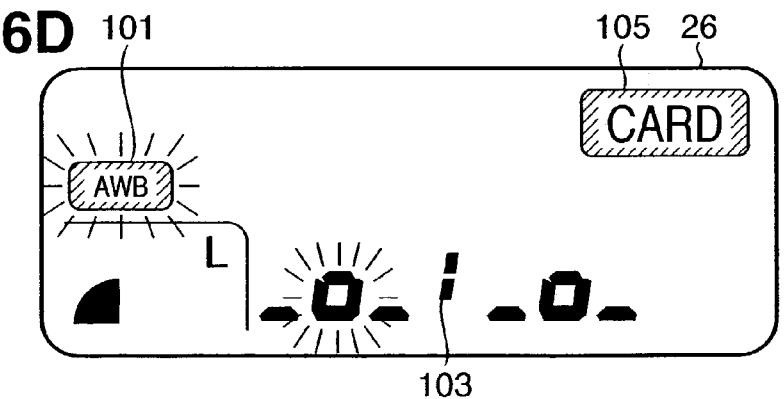

SETTING CONTROL OF BRACKETING IMAGE SENSING OPERATION IN IMAGE SENSING APPARATUS

FIELD OF THE INVENTION

The present invention relates to an image sensing apparatus, such as a digital camera or the like, incorporating a white balance adjusting device, and more specifically, to setting control of bracketing functions in an image sensing apparatus, such as a digital camera or the like, having a plurality of bracketing functions.

BACKGROUND OF THE INVENTION

Some digital cameras employing an image sensor, e.g. a CCD or C-MOS or the like, as an image sensing device, incorporate a white balance adjusting device. Human eyes have an adaptability to perceive a white object as white even if the color temperature of an illuminating light source changes. However, in digital cameras, because it is necessary to adjust and correct data from the image sensing device in accordance with the color temperature of a light source by using software, normally a white balance adjusting device is included.

White balance adjusting methods include: a method that performs white balance control based on data obtained from an image sensing device, a method that performs white balance control based on data obtained from a colorimetric sensor which detects a color temperature of a light source illuminating an object, and a combination of the aforementioned methods.

However, despite using the above-described white balance adjusting device, there are cases depending on image sensing conditions that excellent white balance adjustment cannot be performed. In view of this, Japanese Patent Application Laid-Open No. 1-221994 proposes a white balance bracketing function for obtaining an image having an excellent white balance by recording plural numbers of images, processed with plural white balance correction values which are obtained by shifting the correction value.

While white balance bracketing is a type of image processing, there is an image sensing apparatus having an automatic exposure (AE) bracketing function for performing exposure control, which is a largely different type of processing from the white balance bracketing. Conventionally, the AE bracketing function has been employed by still cameras using silver chloride films. According to an AE bracketing image sensing operation, in a case where it is difficult to determine an appropriate exposure, e.g., a case of sensing an image at sundown or a case where a highly reflective object partially exists in an image, plural frames of one scene are sequentially sensed while changing the set shutter speed and/or f value by a predetermined amount. Then, a frame having the most appropriate exposure is selected from the plural images. Utilizing such image sensing apparatus having the AE bracketing function achieves an advantage in that an image can be sensed automatically with an appropriate exposure or a desired exposure intended by the user, without missing a perfect moment for an excellent image.

However, in the aforementioned image sensing operation using various bracketing functions, image sensing must be performed for plural frames to sense the image while shifting the correction value to the + side and − side by a predetermined amount relative to a reference value. Assume a case of sensing an image by shifting the correction value 2 levels to the + side and 2 levels to the − side relative to a reference value. In this case, image sensing must be performed five times, with the correction value respectively set at −2, −1, 0 (no correction), 1, and 2 (these values conceptually express the correction value including a reference value).

If a camera user feels that it is difficult to properly correct the color temperature using automatic white balance correction and properly detect appropriate exposure using automatic exposure (AE) detection and sets both of the WB and AE bracketing functions, an extremely large number of frames must be sensed. In this case, the user may be unable to determine which image is obtained with what type of correction.

For instance, in a case of performing five times of image sensing with the AE bracketing function in addition to five times of image sensing with the white balance bracketing function as mentioned above, 25 frames of images must be sensed, processed, and/or recorded. This not only wastes the image sensing time, but also requires a large amount of memory capacity to store the sensed images. Further, if another bracketing function is additionally set, the time required for image sensing and the amount of image data increase immensely.

Furthermore, even if a large amount of images are obtained in this manner, the necessary image having an appropriate color and exposure is only one.

Moreover, with regard to an AE bracketing image sensing operation, there has been a camera capable of plural bracketing settings, which prohibits simultaneous setting of different types of factors related to exposure, as proposed by Japanese Patent Application Laid-Open No. 8-29828. However, it has been unable to solve problems related to operability of image processing function setting, e.g., white balance correction or the like, which is necessary for a digital camera.

SUMMARY OF THE INVENTION

The present invention has been made in consideration of the above situation, and has as its object to prevent a user from carelessly setting two or more bracketing functions in a digital camera having plural types of bracketing functions.

According to the present invention, the foregoing object is attained by providing an image sensing apparatus capable of performing bracketing image sensing operations for a plurality of different types of parameters, comprising: a selection unit adapted to select a parameter for performing a bracketing image sensing operation; and a controller adapted to prohibit a bracketing image sensing operation for other types of parameters in a case where the parameter for performing the bracketing image sensing operation is selected by the selection unit.

According to the present invention, the foregoing object is also attained by providing an image sensing apparatus having bracketing image sensing functions, comprising: a first function adapted to perform a first bracketing image sensing operation by changing a parameter for correcting a color temperature of an image-sensing screen; a second function adapted to perform a second bracketing image sensing operation by changing a parameter for correcting an exposure; and a selection unit adapted to select and set one of the first function and the second function.

According to the present invention, the foregoing object is also attained by providing a control method of an image sensing apparatus capable of performing bracketing image sensing operations for a plurality of different types of parameters, comprising: determining whether or not a parameter for a bracketing image sensing operation is selected; and in a case where the parameter is selected, prohibiting selection of a parameter for other bracketing image sensing operation.

According to the present invention, the foregoing object is also attained by providing a control method of an image sensing apparatus having bracketing image sensing functions, comprising: determining whether a first function or a second function is set, the first function provided for performing a first bracketing image sensing operation by changing a parameter for correcting a color temperature of an image-sensing screen, and the second function provided for performing a second bracketing image sensing operation by changing a parameter for correcting an exposure; and in a case where one of the functions is set, prohibiting an operation of the other function.

According to the present invention, the foregoing object is also attained by providing an operation control system of an image sensing apparatus having a first image sensing function for performing bracketing image sensing operation by changing a first parameter which is a color temperature correction value for correcting a color temperature of a sensed image, a second image sensing function for performing bracketing image sensing operation by changing a second parameter which is an exposure control parameter, and a controller for prohibiting one of the first and second image sensing functions in a case where the other image sensing function is selected, comprising: a first display unit adapted to display a setting of set image sensing function when one of the first and second image sensing functions is set; a second display unit adapted to display a setting state by flashing an icon corresponding to the set image sensing function; and a third display unit adapted to display the image sensing function prohibited by the controller, wherein the third display unit flashes an icon corresponding to the prohibited image sensing function, and flashes a setting value of the prohibited image sensing function or displays a value that cannot be set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6D are display examples of the second external display device when setting a white balance bracketing function according to the embodiment of the present invention;

DETAILED DESCRIPTION OF THE PREFERRED EMBODIMENT

A preferred embodiment of the present invention will now be described in detail in accordance with the accompanying drawings.

In this embodiment, a digital camera is described as an example of the image sensing apparatus.

Figure 1:
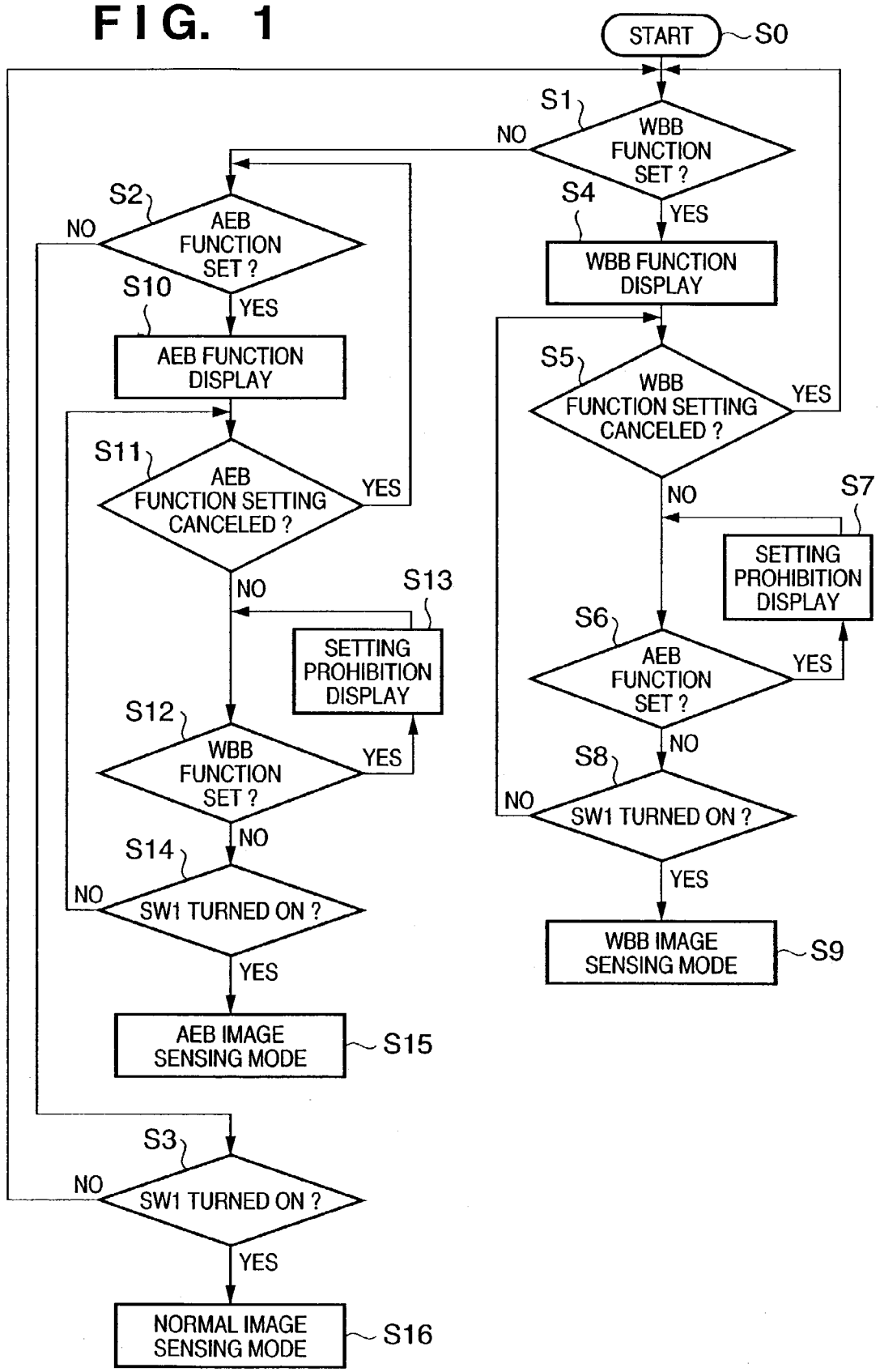
FIG. 1 is a flowchart showing an example of digital camera operation control steps according to an embodiment of the present invention.
Figure 2:
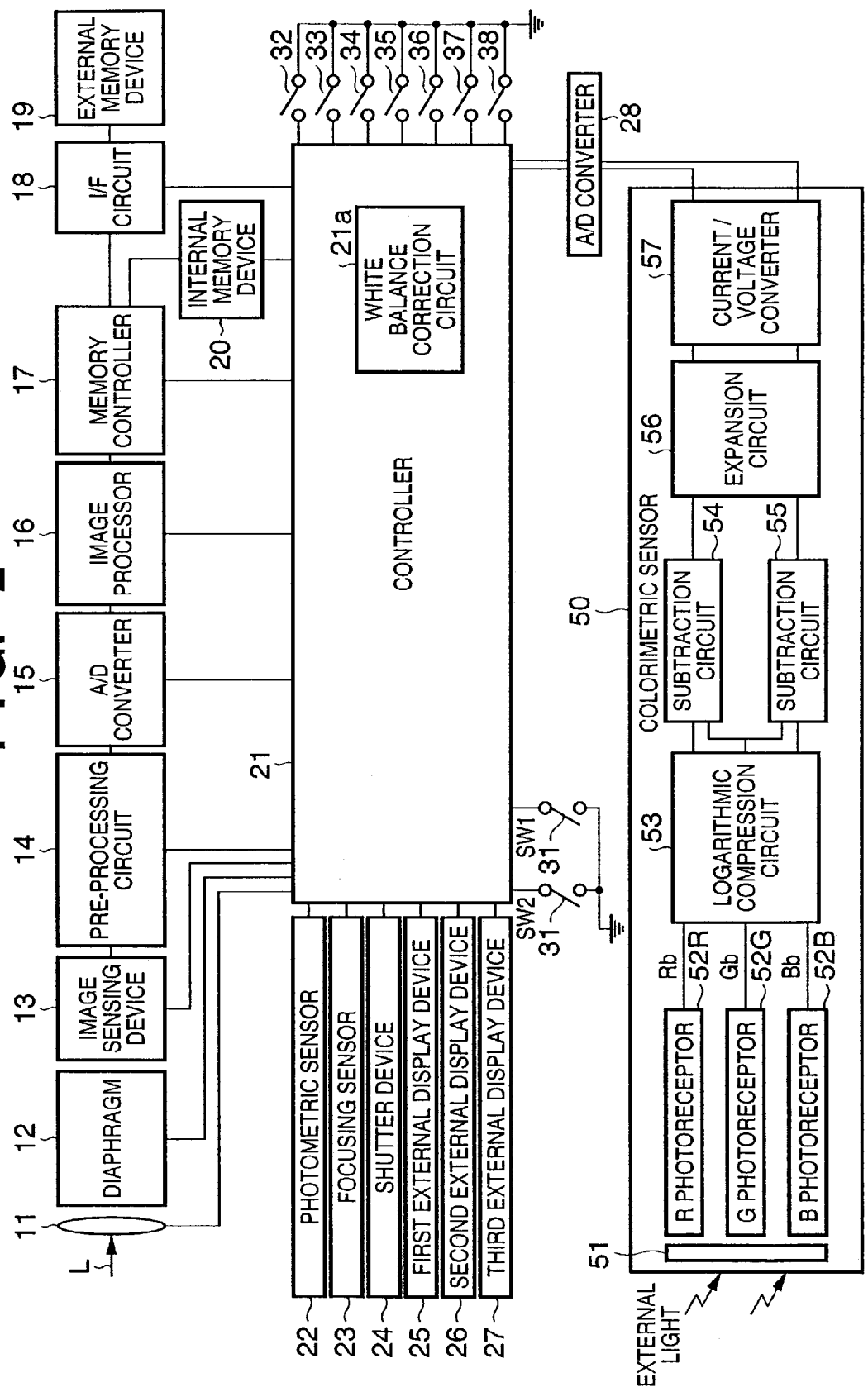
FIG. 2 is a block diagram showing an entire construction of the digital camera according to the embodiment of the present invention.
Figure 3A:
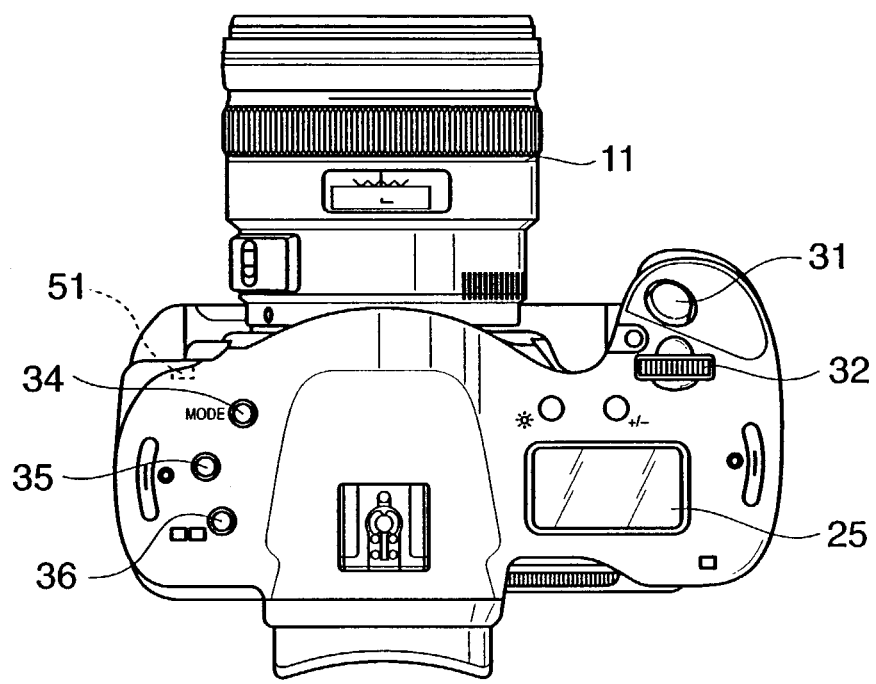
FIG. 3A is a top view showing an external appearance of the digital camera according to the embodiment of the present invention.
Figure 3B:
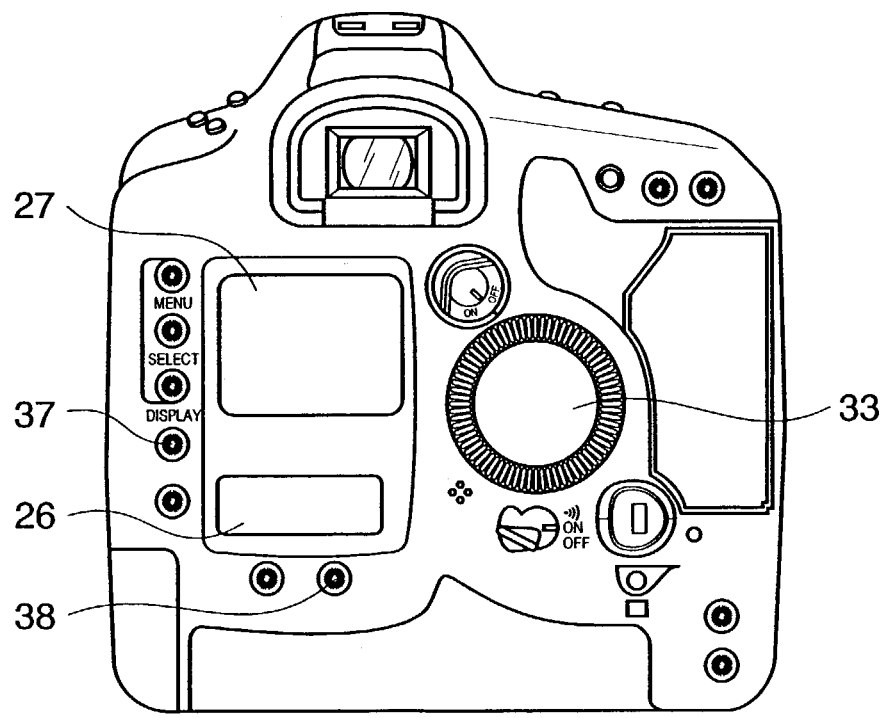
FIG. 3B is a back view showing an external appearance of the digital camera according to the embodiment of the present invention.
Figure 4:
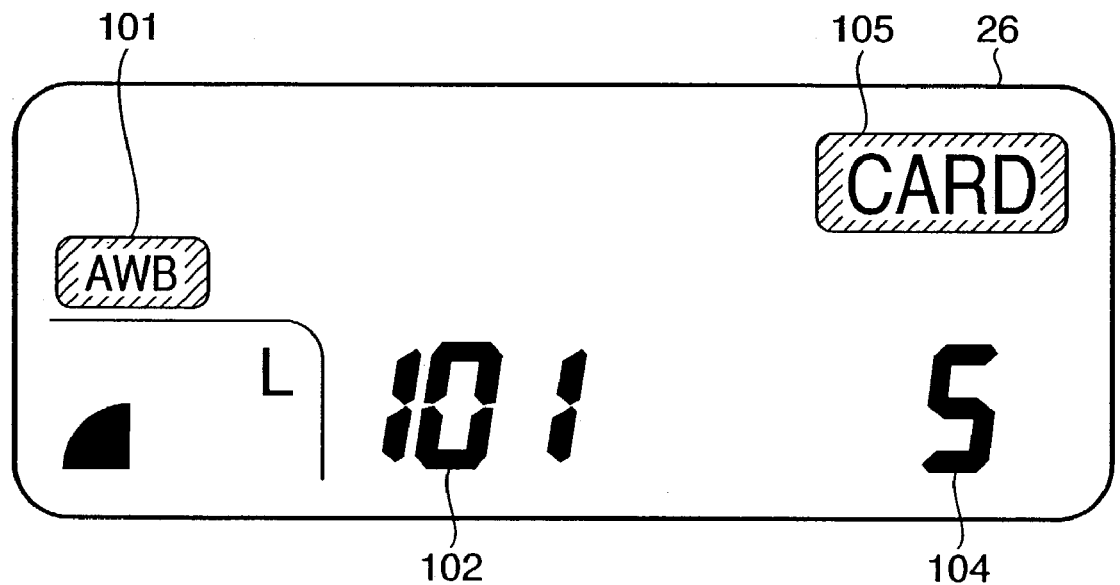
FIG. 4 shows a display example of a second external display device in the normal state according to the embodiment of the present invention.
Figure 5A:
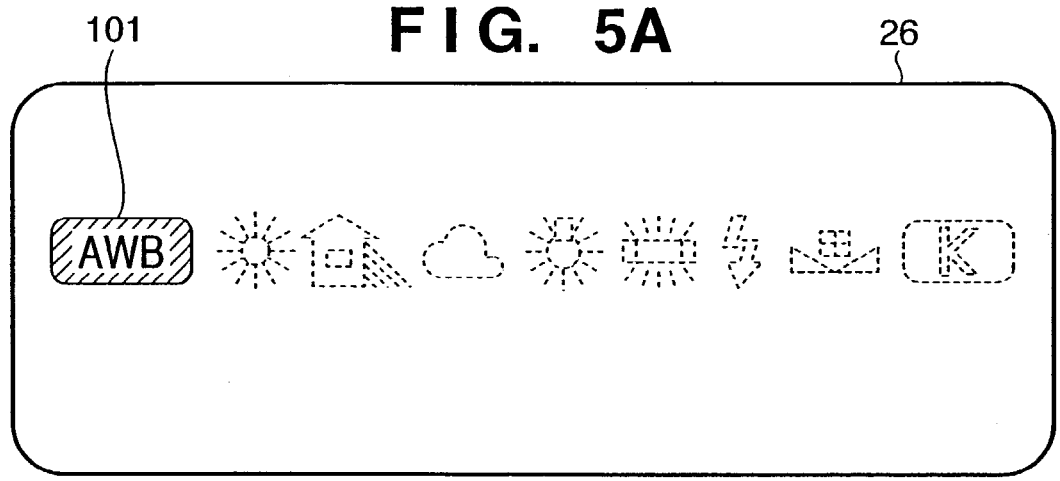
FIGS. 5A to 5C are display examples of the second external display device when setting a white balance correction value according to the embodiment of the present invention.
Figure 5B:
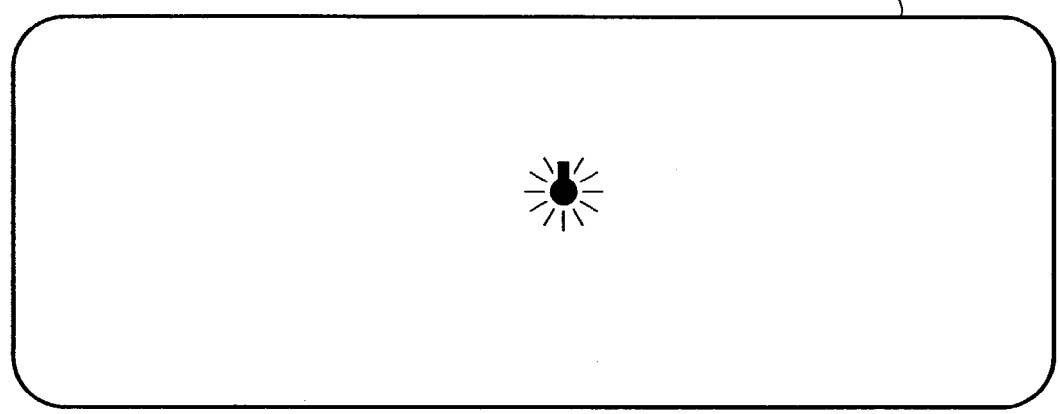
Figure 5C:
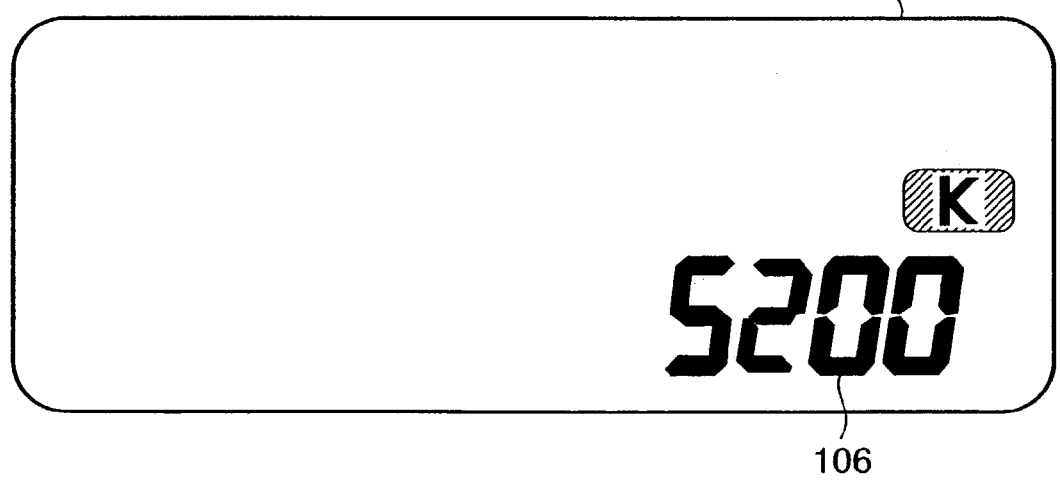
Figure 7:
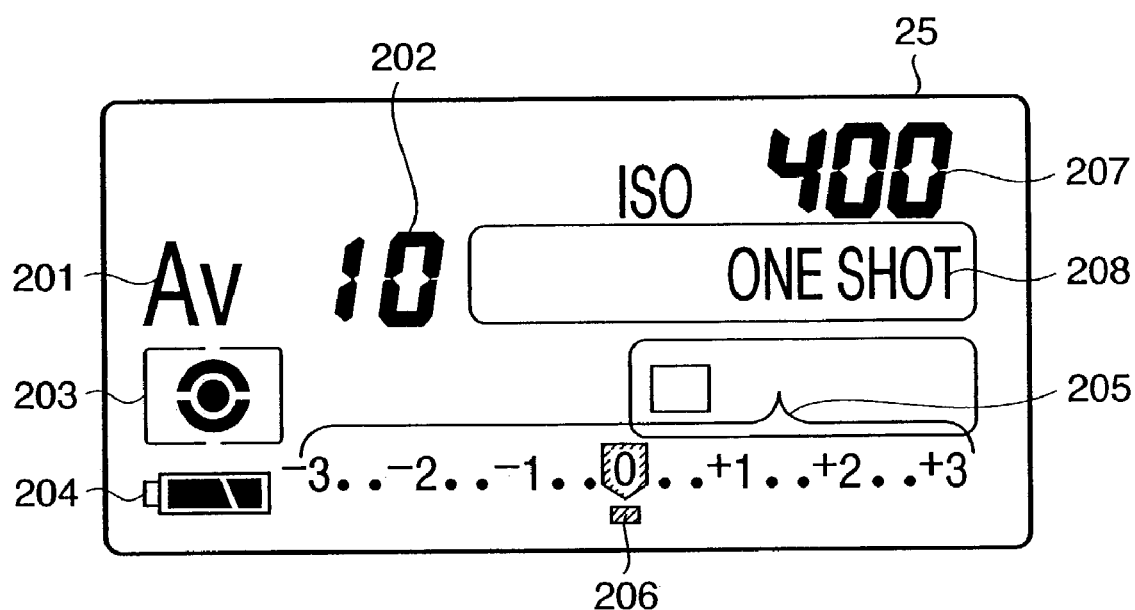
FIG. 7 is a display example of a first external display device in the normal state according to the embodiment of the present invention.
Figure 8:
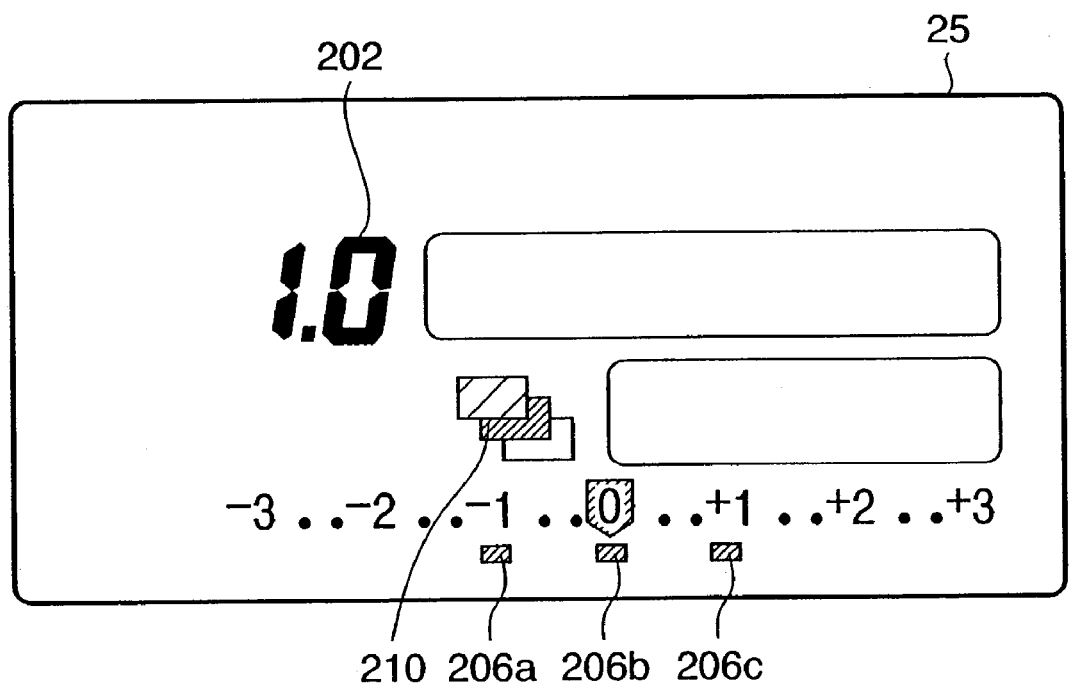
FIG. 8 is a display example of the first external display device showing the state where an AE bracketing function is set according to the embodiment of the present invention.
Figure 9:
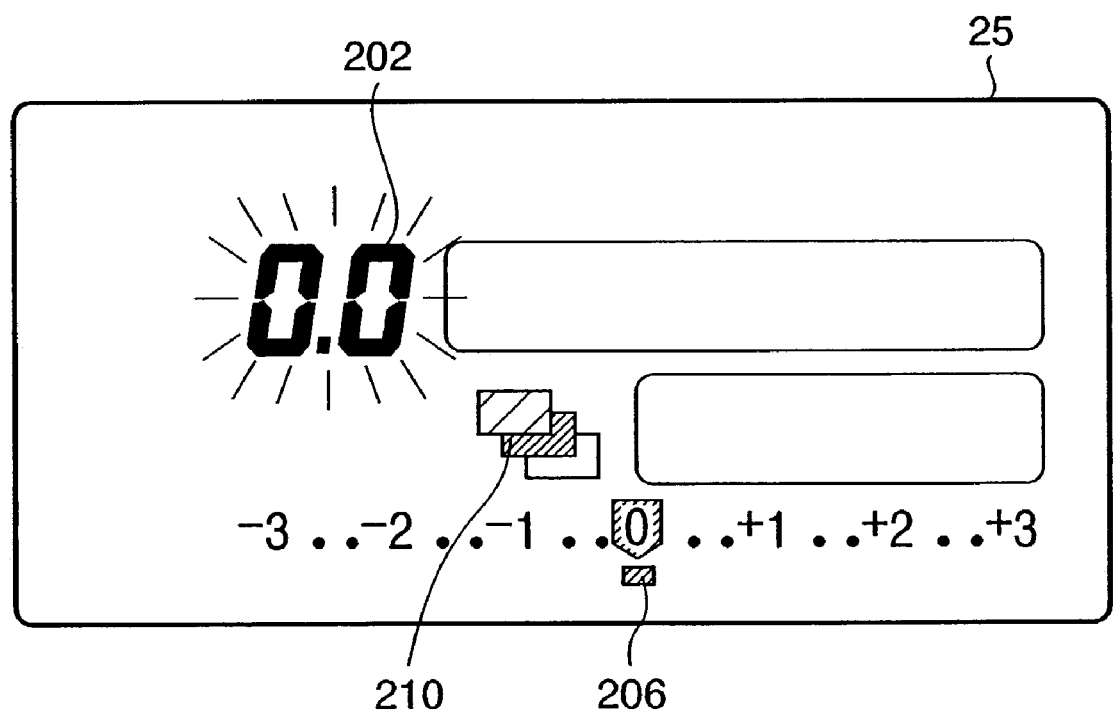
FIG. 9 is a display example of the first external display device showing the state where setting of the AE bracketing function is prohibited according to the embodiment of the present invention.
Figure 10:
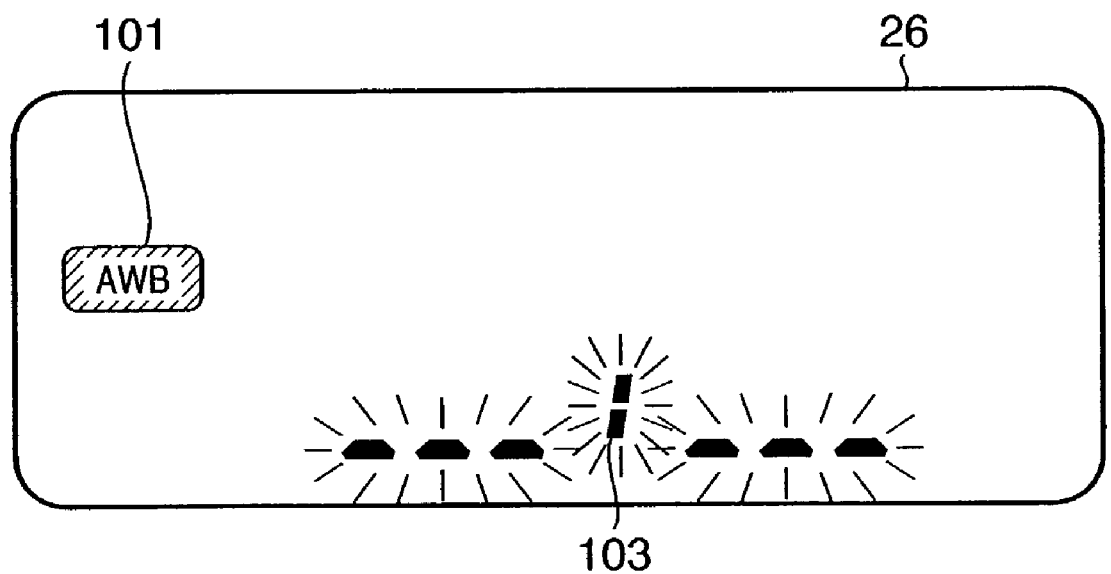
FIG. 10 is a display example of the second external display device showing the state where setting of the white balance bracketing function is prohibited according to the embodiment of the present invention.

FIG. 1 is a flowchart showing an example of digital camera operation control steps according to this embodiment; FIG. 2 is a block diagram showing an entire construction of the digital camera according to this embodiment; FIG. 3A is a top view showing an external appearance of the digital camera according to this embodiment; FIG. 3B is a back view showing an external appearance of the digital camera according to this embodiment: FIG. 4 shows a display example of a second external display device in the normal state according to this embodiment; FIGS. 5A to 5C are display examples of the second external display device when setting a white balance correction value according to this embodiment; FIGS. 6A to 6D are display examples of the second external display device when setting a white balance bracketing function according to this embodiment; FIG. 7 is a display example of a first external display device in the normal state according to this embodiment; FIG. 8 is a display example of the first external display device showing the state where an AE bracketing function is set according to this embodiment; FIG. 9 is a display example of the first external display device showing the state where setting of the AE bracketing function is prohibited according to this embodiment; and FIG. 10 is a display example of the second external display device showing the state where setting of the white balance bracketing function is prohibited according to this embodiment.

First, the construction of each unit is described with reference to the block diagram in FIG. 2, which shows the entire construction of the digital camera.

A light beam L from an object is received by an image sensing device 13 through a lens 11 and a diaphragm 12. The image sensing device 13, serving to convert the received light to an electrical signal, comprises a solid-state image sensing device, such as a charge coupled device (CCD) and a CMOS device or the like. A pre-processing circuit 14 comprises a CDS circuit for removing an output noise of the image sensing device 13, and a non-linear amplifier necessary prior to A/D conversion. An A/D converter 15 digitalizes an analog signal outputted from the pre-processing circuit 14. The digitalized signal is led to an image processor 16 for image processing, e.g., outline compensation, gamma correction, white balance correction and so on, and outputted to a memory controller 17.

A controller 21 includes a white balance correction circuit 21a for calculating a white balance correction value based on a control signal from a calorimetric sensor 50 which will be described later. The calculated white balance correction value is transmitted to the image processor 16, which then performs normal white balance correction or white balance bracketing based on the white balance correction value.

The memory controller 17 stores image signals generated by the image processor 16 in an external memory device 19, e.g., a memory card or the like, through an interface (I/F) circuit 18.

An internal memory device 20 stores a white balance control signal or the like which will be described later.

The diaphragm 12 is controlled by the controller 21 in accordance with an output from a photometric sensor 22, which measures a luminance of an object. Although FIG. 2 shows an arrangement in which the photometric sensor 22 is provided off an optical axis of the lens 11, a so-called through the lens (TTL) system, where the photometric sensor is provided on the optical axis of the lens, may be employed.

A focusing sensor 23, comprising a line sensor, formed with a known CCD or CMOS sensor, provided at a position corresponding to a focusing point, serves to output a focus state signal, which corresponds to a distance between the sensor and an object, to the controller 21.

Based on these various input signals, a CPU of the controller 21 calculates an exposure value, determines the shutter speed and f value, and controls driving of a shutter device 24.

A first external display device 25 is a liquid crystal display device for displaying various setting information mainly related to exposure control. The display device 25 also displays the setting state of a parameter of the AE bracketing mode according to this embodiment.

A second external display device 26 is a liquid crystal display device for displaying various setting information mainly related to image processing. The display device 26 also displays the setting state of image processing parameters of the WB bracketing mode for sensed image data according to this embodiment.

A third external display device 27 is a color liquid crystal display device capable of displaying information related to a sensed image obtained from the image sensing device 13 and various setting states of the camera in detail.

A release button 31 comprises an image sensing preparation switch SW1, which is turned ON when the release button 31 is depressed half way down, and an image sensing switch SW2, which is turned ON when the release button 31 is depressed all the way down.

Reference numerals 32 and 33 denote data input units for inputting various image-sensing setting data. The first data input unit 32 is provided for inputting various image-sensing setting data corresponding mainly to the first external display device 25. The second data input unit 33 is provided for inputting various image-sensing setting data corresponding mainly to the second and third external display devices 26 and 27.

Reference numerals 34 to 36 denote mode setting buttons for selecting various image-sensing setting modes. The button 34 is an image-sensing mode selection button; 35, an AF mode selection button; and 36, a photometry mode selection button.

Reference numerals 37 and 38 denote digital system setting/selecting buttons for performing various setting and making selections. The button 37 is an image display button; and 38, a white balance setting button. The camera comprises various other operation buttons although they are not shown in the drawing.

Next, a description is provided on the colorimetric sensor 50 performing detection of a color temperature, upon which calculation of a white balance correction value is based.

In the calorimetric sensor 50, when light around the sensor 50 enters the R photoreceptor 52R, G photoreceptor 52G, and B photoreceptor 52B through a diffusion plate 51, a red component signal (Rb), green component signal (Gb), and blue component signal (Bb) of the respective incident light are outputted. These color component signals are logarithmically compressed by a logarithmic compression circuit 53, and outputted as logRb, logGb, and logBb.

Next, the outputted signals are transformed to log (Rg/Gb) and log (Bb/Gb) by a subtraction circuits 54 and 55, and then inversely transformed to Rb/Gb and Bb/Gb by an expansion circuit 56. The signals are transmitted to a current/voltage converter 57 and then to an A/D converter 28 for digital conversion, and outputted to the controller 21 as a white balance control signal. In the white balance correction circuit 21a of the controller 21, a final white balance correction value is determined. The white balance control signal outputted from the A/D converter 28 is also transmitted to the internal memory device 20 through the controller 21 to be stored.

Although the above description has been provided only on the white balance correction using a colorimetric sensor for the purpose of simple description, white balance correction may be performed based on data obtained from the image sensing device. Besides this, other known white balance correction methods may be applied to the present invention. Note since the white balance correction itself is not an essence of the present invention, description thereof is omitted.

FIG. 3A is a top view showing an example of a digital camera having the above-described construction, and FIG. 3B is a back view of the digital camera.

The first external display device 25 is arranged on the top surface of the camera main body as shown in FIG. 3A. The second external display device 26 is arranged on the back surface of the camera main body as shown in FIG. 3B.

The third external display device 27 is also arranged on the back surface of the camera main body, which is substantially the same surface as the surface where the second external display device 26 is arranged as shown in FIG. 3B.

Further, the first data input unit 32 and second data input unit 33 are arranged on substantially the same top surface of the camera as the surface where the first external display device 25 is arranged as shown in FIG. 3A. Each of the data input units 32 and 33 is structured with a rotative dial-type input operation member.

The image-sensing mode selection button 34, AF mode selection button 35, and photometry mode selection button 36 are also arranged on the same top surface of the camera as the surface where the first external display device 25 is arranged as shown in FIG. 3A. The buttons are employed to select various image-sensing setting modes corresponding mainly to the first external display device 25.

By depressing each of these buttons, the aforementioned various mode setting can be changed. By simultaneously depressing the image-sensing mode selection button 34 and AF mode selection button 35, the AE bracketing mode can be set, changed, or canceled. By simultaneously depressing the photometry mode selection button 36 and AF mode selection button 35, an ISO speed of the image sensing device can be changed, and also an ISO bracketing mode can be set, changed, or canceled. In the ISO bracketing mode, one scene is sensed plural numbers of times with a reference ISO speed and the adjacent ISO speed of the reference ISO speed.

More specifically, when the second data input unit 33 is operated while simultaneously depressing the image-sensing mode selection button 34 and AF mode selection button 35, the AE bracketing mode can be set or canceled, and parameters thereof can be changed.

Further, when the first data input unit 32 is operated while simultaneously depressing the photometry mode selection button 36 and AF mode selection button 35, an ISO speed value can be set. When the second data input unit 33 is operated while simultaneously depressing the photometry mode selection button 36 and AF mode selection button 35, the ISO bracketing mode can be set or canceled, and parameters thereof can be changed.

The image display button 37 and white balance setting button 38 are arranged on the back surface of the camera main body, which is substantially the same surface as the surface where the second external display device 26 is arranged as shown in FIG. 3B. These buttons are employed to perform various setting or making selections related to image processing corresponding mainly to the second and third external display devices 26 and 27.

By depressing each of these buttons, the aforementioned various operation and setting can be changed. By simultaneously depressing the image display button 37 and white balance setting button 38, the white balance bracketing mode can be set, changed, or canceled. More specifically, when the image display button 37 and white balance setting button 38 are simultaneously depressed, the white balance bracketing mode is set. Then, when the second data input unit 33 is operated while depressing the image display button 37, the white balance bracketing mode can be set or canceled, and parameters thereof can be changed.

FIG. 4 shows a display example of the second external display device 26 in the normal state.

In FIG. 4, an "AWB" icon 101 indicates a white balance setting state. The "AWB" in FIG. 4 indicates that "automatic white balance" is set. In other words, the reference white balance correction values adopts white balance correction values obtained by the calorimetric sensor 50 of the camera, which automatically measures a color temperature of a light source around the sensor 50, as described above with reference to FIG. 2.

Reference numeral 102 denotes a folder number, indicating that a sensed image is recorded in the folder numbered "101" in the external memory device 19.

Reference numeral 104 denotes a file number, indicating the number of shots taken so far. In FIG. 4, 5 shots of images have been taken.

Reference numeral 105 denotes a type of memory medium and an inserted/not-inserted state of the memory medium. This example shows that a flash memory card or the like is inserted in the digital camera as the external memory device 19.

The camera also comprises a mode that allows a user to set white balance correction values, in addition to the automatic white balance based on the result of the colorimetric sensor 50. The display in FIG. 5A is obtained when the white balance setting button 38 in FIG. 2 is depressed. In this state, the currently set "AWB" is displayed, but other marks indicated by dotted lines are not displayed in reality.

When the second data input unit 33 is operated while depressing the white balance setting button 38, each of the marks is lit in turn.

When the second data input unit 33 is shifted by four levels while depressing the white balance setting button 38, the display in FIG. 5B is obtained. This indicates a "light bulb mode" for setting white balance correction values most appropriate for image sensing under an illumination of an incandescent lamp.

Moreover, when the second data input unit 33 is shifted by four more levels while depressing the white balance setting button 38, the display in FIG. 5C is obtained. This indicates a "color temperature mode" which allows a user to directly set a color temperature for white balance correction.

In FIG. 5C, the displayed content 106 shows "5200." This indicates that the color temperature is set in 5200K.

Next, the setting method of the white balance bracketing mode is described with reference to FIGS. 6A to 6D.

When the image display button 37 and white balance setting button 38 are kept simultaneously depressed in the state of the automatic white balance mode in FIG. 5A, the display shown in FIG. 6A is obtained. In FIG. 6A, the "AWB" mark 101 is blinking, indicating that white balance correction values are set in the "automatic white balance mode."

From the state shown in FIG. 6A, if the white balance setting button 38 is released and the second data input unit 33 is shifted by 2 levels while the image display button 37 is kept depressed, the display shown in FIG. 6B is obtained. The ":" mark 103 in the center indicates a reference white balance correction value, and the "o" marks on both sides indicate white balance correction values set for the bracketing image sensing operation. More specifically, the correction levels range from +2 levels to −2 levels relative to the reference white balance correction value. 1 level in this case is predetermined as, e.g., 100 kelvin, using a kelvin value which is a unit for expressing a color temperature of light. Therefore, three types of white balance correction, i.e., the reference white balance correction value, +200 kelvin and −200 kelvin relative to the reference white balance correction value, can be performed. Note that the correction value setting is not limited to 1 level=100 kelvin.

By further operating the second data input unit 33 in the similar manner, the correction level can be changed. Moreover, if the image display button 37 is released after selecting the ":" mark 103 as the correction level, the white balance bracketing mode is canceled.

With the state shown in FIG. 6B, if the image display button 37 is released, the camera is set to perform three types of white balance correction, i.e., the reference white balance correction value, +2 levels and −2 levels relative to the reference white balance correction value, the display shown in FIG. 6C is obtained. The display shown FIG. 6C shows the same contents as that shown in FIG. 4, except that the "AWB" icon 101 is blinking in FIG. 6C. The blinking icon 101 indicative of the white balance control clearly informs the user that the white balance bracketing is currently set.

Furthermore, by half-stroke operation of the release button 31, the image sensing preparation switch (SW1) is turned ON and the display shown in FIG. 6D is obtained. The ":" mark 103 indicative of the reference white balance correction value, the left "o" mark indicative of the white balance correction value at −2 levels, and the right "o" mark indicative of the white balance correction value at +2 levels, serve to inform the user of the current setting of the white balance correction value by blinking.

FIG. 7 is a display example of the first external display device 25 in the normal state.

Reference numeral 201 denotes an image sensing mode. The "Av" mark in FIG. 7 indicates an aperture priority mode. Reference numeral 202 denotes an f value, which is currently set at 10 in FIG. 7. Reference numeral 203 denotes a photometry mode, which shows that an evaluative photometry mode is currently set. Reference numeral 204 denotes a battery check mark, which shows that the battery is currently in an excellent state. Reference numeral 205 denotes an exposure-level scale, serving as an indicator to display the state of exposure correction. Reference numeral 206 denotes an exposure correction level, which indicates that 0 in the exposure-level scale, i.e., a reference exposure, is currently set. Reference numeral 207 denotes an ISO speed indicator, which indicates that ISO400-relevant image sensing is currently performed. Reference numeral 208 denotes an AF mode. The current display "ONE SHOT" indicates a one-shot AF mode.

Next, a display example where the AE bracketing mode is set is described with reference to FIG. 8. Assume herein that the white balance bracketing mode, which has been described with reference to FIGS. 6A to 6D, is canceled.

The state shown in FIG. 8 is obtained when the second data input unit 33 is shifted by three levels while simultaneously depressing the image-sensing mode selection button 34 and AF mode selection button 35 as described above with reference to FIGS. 3A and 3B. An icon 210 indicates that the AE bracketing mode is set. The marks 206a to 206c are the correction levels of exposure control set as the bracketing image sensing operation, with the mark 206b under the indicator "0" in the central portion being the reference exposure. In other words, three types of exposure control are performed in total, i.e., the reference exposure value, +1 level and −1 level relative to the reference exposure value.

The f value 202 is set in "1.0", indicating that the level of exposure control is one level.

By further operating the second data input unit 33 in the similar manner, the correction level can be changed. Moreover, if the correction level is set to meet the indicator "0", in other words, if it is operated so that the marks 206a to 206c come under the indicator "0", the AE bracketing mode is canceled and the icon 210 is turned off.

Next, a description is provided with reference to FIG. 9 on the case where a user attempts to perform AE bracketing image sensing operation as described above with reference to FIG. 8 after the white balance bracketing mode is set as described above with reference to FIGS. 6A to 6D.

Referring to FIG. 9, the indicator "0.0" representing the f value 202 is blinking to warn the user that simultaneous setting of two types of bracketing modes is prohibited. Even if the second data input unit 33 is clicked in this state, the mark 206 does not move, inhibiting AE bracketing mode setting.

On the contrary, if a user attempts to set white balance bracketing mode as described above with reference to FIGS. 6A to 6D after the AE bracketing mode is set as described above with reference to FIG. 8, the ":" mark 103 in the center and "_" mark on both sides start blinking as shown in FIG. 10 to warn the user that setting of the white balance bracketing mode is prohibited. Even if the second data input unit 33 is clicked in this state, the "o" mark is not displayed, inhibiting white balance bracketing mode setting.

Note that although a description for the ISO bracketing mode setting is not provided herein, the setting can be realized in the similar manner to the above-described AE bracketing mode setting and white balance bracketing mode setting.

FIG. 1 is a flowchart showing an example of digital camera operation control steps according to the present embodiment. The flowchart describes the aforementioned operation flow.

Note in the following description, assume that the above-described "automatic white balance" correction is selected as a white balance mode.

In step S0, the operation starts with the normal state where the first and second external display devices 25 and 26 show displays shown in FIGS. 7 and 4 respectively. In steps S1 and S2, if neither the white balance bracketing (WBB) function nor AE bracketing (AEB) function is set, the control proceeds to step S3. In step S3, when the image sensing preparation switch (SW1) 31 is depressed, the normal image sensing mode begins.

If the white balance bracketing function is set in step S1, the second external display device 26 displays the state shown in FIGS. 5A to 5C, 6A, and 6B, and the control proceeds to step S4. In step S4, the display device displays the state shown in FIG. 6C.

As described above, since the icon (herein, "AWB" icon 101), indicative of the white balance bracketing function, blinks to indicate that the camera is in the state of white balance bracketing image sensing operation, it is possible to quickly and intuitively inform the camera user that setting of other bracketing functions is prohibited.

Alternatively, when the white balance bracketing function is set, the setting content of the white balance bracketing function may be displayed to indicate that the camera is in the state of white balance bracketing image sensing operation, thereby informing the camera user that setting of other bracketing function cannot be performed.

In step S5, if the AWB setting is canceled, the second external display device 26 displays the state shown in FIG. 6A and returns to the state in FIG. 4. If the AWB setting is not cancelled in step S5, the control proceeds to step S6. Herein, if the user attempts to perform AE bracketing function setting, the control proceeds to step S7 where the first external display device 25 displays setting prohibition shown in FIG. 9. This state continues until the AE bracketing function setting is canceled.

As described above, in a case where the camera user attempts to set a bracketing function other than the white balance bracketing function (e.g., AE bracketing, ISO bracketing) despite its setting prohibition, the aforementioned warning that prohibits setting of other bracketing functions is displayed. Accordingly, it is possible to quickly and intuitively inform the user that the aforementioned setting of other bracketing functions is prohibited.

Alternatively, an icon indicative of the prohibited bracketing function or the value/values subjected to prohibited bracketing function setting may be flashed, or a value/values that cannot be used in setting may be displayed to inform the user that setting of other bracketing functions is prohibited.

When setting of the AE bracketing function is not performed or is canceled (NO in step S6), the control proceeds to step S8. In step S8, when the image sensing preparation switch (SW1) 31 is depressed, the control proceeds to step S9 to prepare an image sensing operation in the white balance bracketing mode.

As described above, in a camera having a white balance bracketing function, setting of AE bracketing function is prohibited while the white balance bracketing function is set. Accordingly, a large amount of complicated bracketing image sensing operation can be prevented.

In step S1, if the white balance bracketing function is not set, the control proceeds to step S2. When the AE bracketing function is set in step S2, the first external display device 25 displays the state shown in FIG. 8, and the control proceeds to step S10. When the AE bracketing function setting is canceled in step S11, the display device returns to the state shown in FIG. 7. If the AE bracketing function setting is not canceled, the control proceeds to step S12. Herein, if the user attempts to set the white balance bracketing function, the control proceeds to step S13 where the second external display device 26 displays the state shown in FIG. 10 to prohibit the setting. This state continues until the white balance bracketing function setting is canceled.

As described above, if a user attempts to set the white balance bracketing function while a bracketing function other than the white balance bracketing function (herein, AE bracketing function) is set, the value/values subjected to white balance bracketing function setting is/are flashed, or a value/values that cannot be used in setting is/are displayed. Accordingly, it is possible to quickly and intuitively inform the user that setting of the white balance bracketing function is prohibited.

Furthermore, the setting prohibition may be informed by displaying setting prohibition of the white balance bracketing function, displaying other bracketing function setting, flashing an icon indicative of the AE bracketing function setting, or flashing an icon indicative of the white balance bracketing function setting. If setting of the white balance bracketing function is not performed or is canceled in step S12, the control proceeds to step S14. In step S14, when the image sensing preparation switch (SW1) 31 is depressed, the control proceeds to step S15 to prepare an image sensing operation in the AE bracketing mode.

As described above, setting of white balance bracketing function is prohibited while the AE bracketing function is set. Accordingly, a large amount of complicated bracketing image sensing operation can be prevented.

Note that the foregoing embodiment is an example provided for explaining the construction of the present invention in an easy-to-understand manner. Therefore, the present invention is not limited to the embodiment provided herein.

In the foregoing embodiment, white balance bracketing, AE bracketing, and ISO bracketing are provided as types of bracketing image sensing operation, and particularly, the white balance bracketing and AE bracketing are described as an example. However, it should be apparent that the present invention is not limited to this, and is applicable to other bracketing image sensing operation.

OTHER EMBODIMENT

The present invention can be applied to a system constituted by a plurality of devices (e.g., host computer, interface, camera head) or to an apparatus comprising a single device (e.g., digital camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, ROM, and a computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions of the above embodiment.

In a case where the present invention is applied to the aforesaid storage medium, the storage medium stores program codes corresponding to the flowchart in FIG. 1 described in the embodiment.

The present invention is not limited to the above embodiment and various changes and modifications can be made within the spirit and scope of the present invention. Therefore, to apprise the public of the scope of the present invention, the following claims are made.

What is claimed is:

1. An operation control system of an image sensing apparatus having a first image sensing function for performing bracketing image sensing operation by changing a first parameter which is a color temperature correction value for correcting a color temperature of a sensed image, a second image sensing function for performing bracketing image sensing operation by changing a second parameter which is an exposure control parameter, and a controller for prohibiting one of the first and second image sensing functions in a case where the other image sensing function is selected, comprising:

a first display unit adapted to display a setting of set image sensing function when one of the first and second image sensing functions is set;

a second display unit adapted to display a setting state by flashing an icon corresponding to the set image sensing function; and a third display unit adapted to display the image sensing function prohibited by said controller;

wherein said third display unit flashes an icon corresponding to the prohibited image sensing function, and flashes a setting value of the prohibited image sensing function or displays a value that cannot be set.

* * * * *